US012526823B2

(12) United States Patent
Manepalli et al.

(10) Patent No.: US 12,526,823 B2
(45) Date of Patent: Jan. 13, 2026

(54) RETRANSMISSION OF MESH LINK ESTABLISHMENT ADVERTISEMENTS IN A THREAD NETWORK

(71) Applicant: Apple Inc., Cupertino, CA (US)

(72) Inventors: Venkateswara Rao Manepalli, San Jose, CA (US); Manuel Roman Cuesta, Sunnyvale, CA (US); Yaranama Venkata Ramana Dass, Belmont, CA (US); Sarvesh Kumar Varatharajan, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 308 days.

(21) Appl. No.: 17/889,083

(22) Filed: Aug. 16, 2022

(65) Prior Publication Data

US 2023/0094988 A1    Mar. 30, 2023

Related U.S. Application Data

(60) Provisional application No. 63/247,955, filed on Sep. 24, 2021.

(51) Int. Cl.
*H04W 84/18* (2009.01)
*H04W 72/30* (2023.01)
*H04W 99/00* (2009.01)

(52) U.S. Cl.
CPC ........... *H04W 72/30* (2023.01); *H04W 99/00* (2013.01)

(58) Field of Classification Search
CPC ..... H04L 12/4604; H04L 45/10; H04L 45/16; H04L 45/60; H04L 69/16; H04W 72/30;

(Continued)

(56) References Cited

U.S. PATENT DOCUMENTS 9,344,365 B1 * 5/2016 Hui ..................... H04W 8/26
10,820,314 B2 * 10/2020 Patil ................. H04W 72/0446

(Continued)

FOREIGN PATENT DOCUMENTS

JP    2016174214 A  *  9/2016

OTHER PUBLICATIONS

English translation of Nishimura Hiroshi (JP 2016174214 A), 7 pages, Sep. 29, 2016.*
ZigBee Alliance, ZigBee IP Specification, 86 pages, Feb. 2013.*

*Primary Examiner* — Frank Duong
(74) *Attorney, Agent, or Firm* — STERNE, KESSLER, GOLDSTEIN & FOX P.L.L.C.

(57) ABSTRACT

An approach is described for a wireless device comprising a transceiver and a processor communicatively coupled to the transceiver. In a thread-based mesh network, a transmitting device occasionally transmits various multicast messages to the network for the purpose of maintaining the network. Of these messages, the mesh link establishment (MLE) advertisement message is particularly important as it notifies neighbor routers as to the presence and function of the transmitting device. Therefore, the transmitting device of the present disclosure transmits its MLE advertisement message to the network multiple times within a given time window. Additionally, the message is transmitted each time with a same identifier. A recipient device stores the identifier of each most recent MLE advertisement message. The identifier of each subsequently received MLE advertisement is compared to the stored identifier. This allows the recipient device to determine whether the message has been previously received.

20 Claims, 7 Drawing Sheets

(58) Field of Classification Search
CPC ..... H04W 80/00; H04W 80/02; H04W 84/04; H04W 84/10; H04W 84/18; H04W 88/06; H04W 99/00; Y02D 30/70
See application file for complete search history.

(56) References Cited

U.S. PATENT DOCUMENTS

| | | | |
|---|---|---|---|
| 10,827,484 B2* | 11/2020 | Patil | H04L 5/0055 |
| 2014/0304078 A1* | 10/2014 | Abraham | H04W 56/00 |
| | | | 705/14.61 |
| 2020/0404513 A1* | 12/2020 | Hayes | H04L 67/1089 |
| 2021/0194766 A1* | 6/2021 | Crafts | H04L 45/58 |
| 2023/0199610 A1* | 6/2023 | Hui | H04W 40/12 |
| | | | 370/328 |

* cited by examiner

RETRANSMISSION OF MESH LINK ESTABLISHMENT ADVERTISEMENTS IN A THREAD NETWORK

CROSS-REFERENCE TO RELATED APPLICATIONS

This application claims the benefit of U.S. Provisional Application No. 63/247,955, filed on Sep. 24, 2021, which is incorporated by reference herein in its entirety.

BACKGROUND

Field

The described aspects generally relate to thread networks.

Related Art

A wireless network such as an internet of things (IoT) network may include a massive number of devices, such as sensors, actuators, wearable devices, security appliances, smart home devices, etc. Thread network technology improves the wireless network by connecting the devices in the wireless network, such as IoT devices, with robust and energy-efficient communication links.

SUMMARY

Some aspects of this disclosure relate to apparatuses and methods for implementing an enhancement on a thread network. For example, systems and methods are provided for implementing Mesh Link Establishment (MLE) advertising repetition among thread network devices.

Some aspects of the disclosure relate to a wireless device comprising a transceiver configured to communicate with a second wireless device and a processor communicatively coupled to the transceiver. The processors is configured to detect a start of an advertisement window having a predefined duration, prepare an advertisement message in response to the detecting, forward the advertisement message to the transceiver; cause the transceiver to transmit the advertisement message to the network a plurality of times during the duration of the new advertisement window; and suppress multiple transmissions of other messages, wherein the other messages are multicast messages, whereby network traffic is minimized.

Some aspects of the disclosure relate to the wireless device, wherein the advertisement message is a mesh link establishment advertisement message.

Some aspects of the disclosure relate to the wireless device, wherein the advertisement message is a multicast message.

Some aspects of the disclosure relate to the wireless device, wherein the transceiver includes a radio driver configured to process messages for transmission.

Some aspects of the disclosure relate to the wireless device, wherein the radio driver is configured to filter non-MLE advertisement messages from being retransmitted.

Some aspects of the disclosure relate to the wireless device, wherein the processor is further configured to prepare the advertisement message with an identifier.

Some aspects of the disclosure relate to the wireless device, wherein each of the plurality of advertisement message transmissions include the identifier.

Some aspects of the disclosure relate to the wireless device, wherein the radio driver is further configured to delay each successive transmission of the advertisement message by a predefined delay.

Some aspects of the disclosure relate to a method for repeated transmission of an advertisement message in a thread network, the method comprising detecting a start of an advertisement window having a predetermined duration, preparing an advertisement message in response to the detecting, transmitting the advertisement message to the network a plurality of times within the advertisement window, and suppressing multiple transmissions of other messages, wherein the other messages are multicast messages, whereby network traffic is minimized.

Some aspects of the disclosure relate to the method, wherein the advertisement message includes an identifier.

Some aspects of the disclosure relate to the method, wherein the identifier is a frame counter.

Some aspects of the disclosure relate to the method, wherein the advertisement message is a mesh link establishment advertisement message.

Some aspects of the disclosure relate to the method, wherein the advertisement message is multicast to the network.

Some aspects of the disclosure relate to the method, further comprising filtering non-advertisement messages from being transmitting to the network multiple times.

Some aspects of the disclosure relate to a wireless communication device, comprising a transceiver configured to communicate with other devices within a network, and a processor communicatively coupled to the transceiver. The processor is configured to: receive a message from the network, identify the message as an advertisement message, extract an identifier from the message, compare the extracted identifier to a previously stored identifier, and process or discard the message based on the comparing.

Some aspects of the disclosure relate to the wireless communication device, wherein the processor is further configured to determine that the extracted identifier does not match the previously stored identifier.

Some aspects of the disclosure relate to the wireless communication device, wherein the processor is further configured to, in response to the determining, overwrite the previously stored identifier with the extracted identifier.

Some aspects of the disclosure relate to the wireless communication device, wherein the processor is further configured to discard the message in response to determining that the extracted identifier matches the previously stored identifier.

Some aspects of the disclosure relate to the wireless communication device, wherein the processor is further configured to process the received message in response to determining that extracted identifier does not match the previously stored identifier.

Some aspects of the disclosure relate to the wireless communication device, wherein the received message is a multicast mesh link establishment advertisement message.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
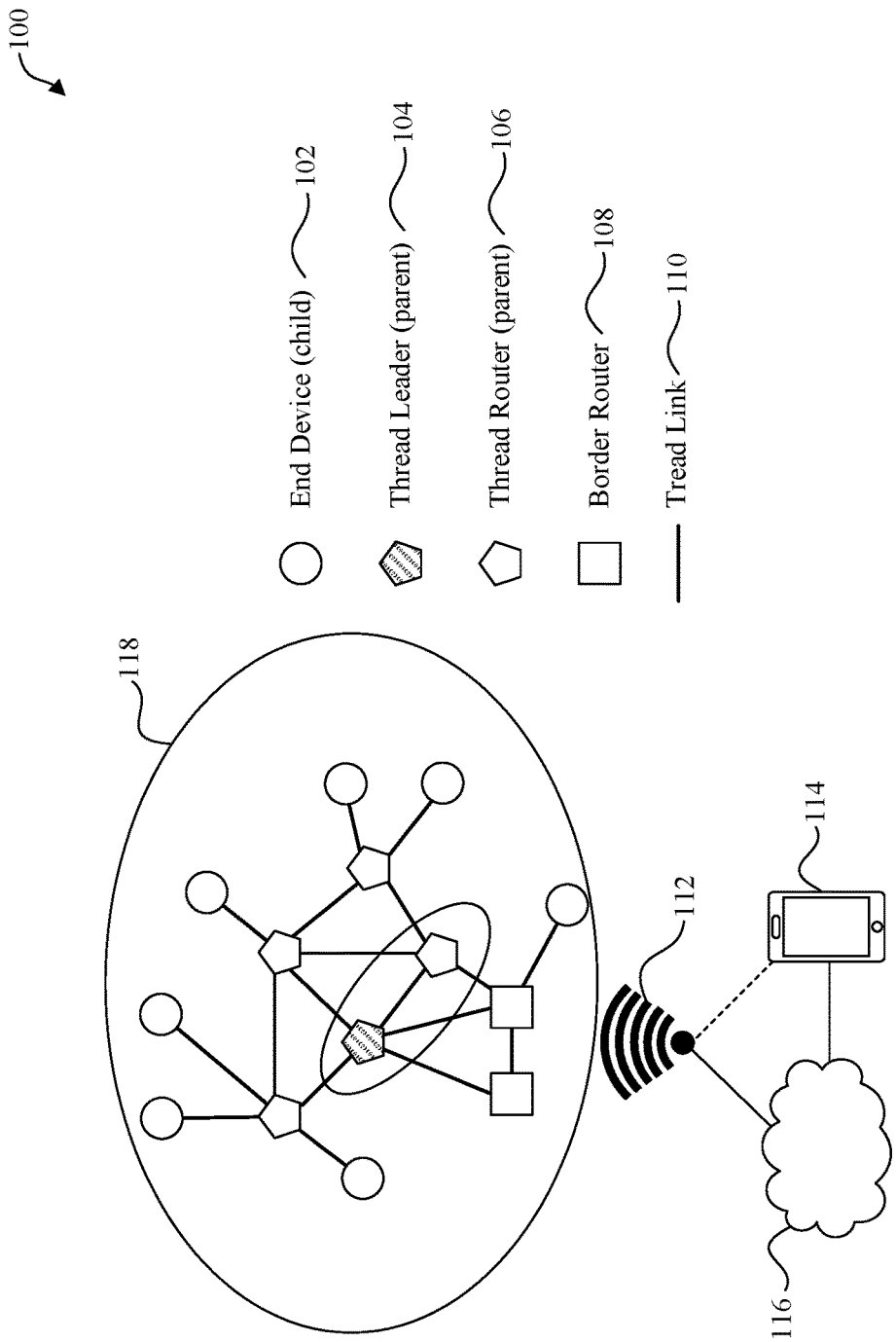
FIG. 1 illustrates an example system implementing a communication network including a thread network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing enhancements of a thread network. For example, systems and methods are provided for implementing MLE advertisement repetition in the Thread network.

According to some aspects, a communication network, such as an internet of things (IoT) network, may include a number of communication devices, such as sensors, actuators, wearable devices, security appliances, smart home devices, etc. In some aspects, the communication devices are wireless devices. In some aspects, the communication devices are Thread devices operating in a mesh network. Within the mesh network, different devices (e.g., nodes) are assigned different roles. When a node is added to, or dropped from, the network or when a node's role changes, it is important to update other nodes in the network in order to maintain the integrity of the mesh. Likewise, some nodes will detect changes in the network when a nearby node fails to "check in" after a certain amount of time.

According to aspects of the disclosure, this updating/check in process involves a device broadcasting or multicasting certain messages to the network. The messages are not designated for any particular recipient, and provide crucial status information for maintaining mesh integrity. According to aspects of the disclosure, these messages are mesh link establishment (MLE) advertisement messages. Because these messages play a critical role in maintaining the mesh, it is equally important that the messages be properly received by the nodes that require them.

Therefore, according to aspects of the disclosure, nodes within the mesh are configured to identify certain high-importance messages and to transmit those messages multiple times. According to aspects of the disclosure, each repeated transmission of those messages is the same and includes at least some of the same identifying information so that duplicates can properly be discarded by recipient devices.

According to aspects of the disclosure, a recipient device is configured to receive one or more of the repeated transmissions. Therefore, the recipient device is configured to identify certain high-importance messages that were likely to have been transmitted repeatedly. The recipient device extracts and stores certain identifying information relating to the message for future reference. Then, upon reception of another high-importance message, the recipient device again extracts identifying information. This identifying information is compared to the previously-stored identifying information. A match indicates a duplicate message, in which case the more recent message is discarded. A non-match indicates a new message. According to aspects of the disclosure, in this case, the extracted identifying information is then stored for future reference and the message is processed.

FIG. 1 illustrates an exemplary system 100 implementing a communication network including a thread network 118, according to some aspects of the disclosure. Example system 100 is provided for the purpose of illustration only and does not limit the disclosed aspects. System 100 may include, but is not limited to, an access point 112, a user equipment (UE) 114, an internet 116, and the thread network 118 including one or more end devices 102, one or more thread leader devices 104, one or more thread routers 106, and one or more border routers 108. Devices in the thread network 118 are connected via thread links 110. The devices in the thread network 118, such as the one or more end devices 102, the one or more thread leader devices 104, the one or more thread routers 106, and the one or more border routers 108, may include electronic devices configured to operate using one or more institute of electrical and electronics engineers (IEEE) 802.15 standards, such as IEEE 802.15.4 standard supporting ZigBee and Z-Wave, IEEE 802.15.1 standard supporting Bluetooth, etc. The electronic devices may also be configured to operate using other wireless standards, such as IEEE 802.11. The electronic devices may include, but are not limited to, wireless communication devices, home entertainment devices, smartphones, laptops, desktops, tablets, personal assistants, monitors, televisions, wearable devices, Internet of Things (IoT) devices, vehicle communication devices, and the like.

According to some aspects, an end device 102 communicates primarily with a thread router 106. For example, the end device 102 directly transmits packets to and receives packets from the thread router 106. The end device 102 communicates with other devices in the thread network 118 or devices outside the thread network 118 via the thread router 106. In some aspects, the end device 102 is a low power device. The end device 102 may disable its transmission and receiving to reduce power consumption.

According to some aspects, the thread router 106 forwards packets for other devices in the thread network 118. For example, the thread router 106 receives a packet from the end device 102 and forwards the packet to a second end device 102 or a second thread router 106. The thread router 106 keeps its transmission and receiving enabled at all times.

According to some aspects, a thread leader device 104 also forwards packets for other devices in the thread network 118 in a similar way as the thread router 106 as described above. For example, the thread leader device 104 receives a packet from the thread router 106 and forwards the packet to the second thread router 106. In some aspects, the thread leader device 104 manages a set of one or more thread routers 106 in the thread network 118. In some aspects, the thread leader device 104 is self-elected. For example, when the thread leader device 104 becomes unavailable, the thread router 106 or the end device 102 is self-elected and promoted to be a thread leader device 104.

According to some aspects, a border router 108 connects thread devices in the thread network 118 and devices outside the thread network 112. For example, the border router 108 receives a packet from a thread router 106 and forwards the packet to the access point 112. For another example, the border router 108 receives a second packet from the access point 112 and forwards the packet to the thread router 106.

According to some aspects, the access point 112 may include electronic devices configured to operate based on a wide variety of wireless communication techniques such as, but are not limited to, techniques based on IEEE 802.11 standard, IEEE 802.15 standard, and one or more 3GPP standards, such as Release 15 (Rel-15), Release 16 (Rel-16), or Release 17 (Rel-17) or other 3GPP releases. The access point 112 may include, but is not limited to, a router device, a base station, and a mobile base station. The UE 105 may include an electronic device configured to operate using IEEE 802.11 standard, IEEE 802.15 standard, and/or one or more 3GPP releases, such as Release 15 (Rel-15), Release 16 (Rel-16), Release 17 (Rel-17), or other 3GPP releases. The UE 105 may include, but is not limited to, wireless communication devices, smartphones, laptops, desktops, tablets, personal assistants, monitors, televisions, wearable devices, Internet of Things (IoT) devices, vehicle communication devices, and the like. In some aspects, the access point 112 directly connects to the internet 116. The UE 114 may connect to the internet 116 directly or indirectly via the access point 112.

In order to maintain the mesh network, some thread devices periodically transmit various multicast (e.g. broadcast) messages to the network. These messages can include a variety of mesh maintenance messages, such as Parent Request, Link Request, Advertisement, Discovery Request, Address Query, Data Response, and Multicast Protocol for Low-Power and Loss Networks (MPL) messages. Among these messages, the advertisement is particularly important because it notifies other network nodes as to the presence of the transmitting node. For example, if the advertisement message is not detected by the other network nodes, then it is presumed that the transmitting node is no longer a participating member of the network. This triggers network rearrangement and node role reassignments, which requires the transmitting and processing of numerous messages between the different nodes. This process can last on the order of minutes, which can cause significant data loss. Therefore, disclosed herein are implementations for improving successful transmission of mesh link establishment (MLE) advertisement messages.

Figure 2:
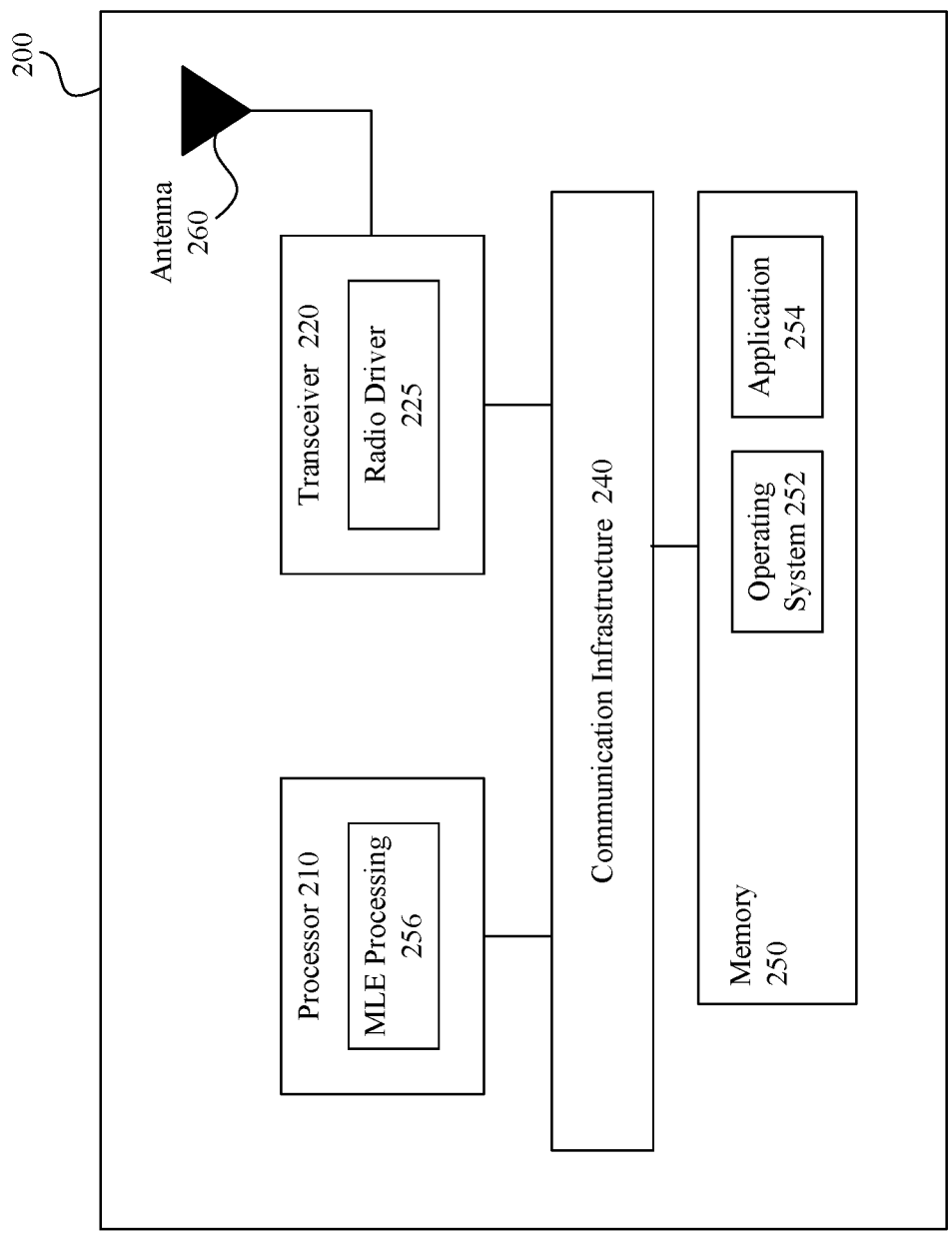
FIG. 2 illustrates a block diagram of an example system of an electronic device for the communication network, according to some aspects of the disclosure.

FIG. 2 illustrates a block diagram of an example system 200 of an electronic device implementing mechanisms for a thread network, according to some aspects of the disclosure. The system 200 may be any of the electronic devices (e.g., an end device 102, a thread leader device 104, a thread router 106, and a border router 108) of the thread network 118 of the system 100. System 200 includes a processor 210, one or more transceivers 220, a communication infrastructure 240, a memory 250, an operating system 252, an application 254, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, Apple TV™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus. The processor 210, alone, or together with instructions stored in the memory 250 performs operations enabling system 200 of the thread network 118 of the system 100 to implement mechanisms for carrier-sense multiple access and carrier aggregation of thread devices, as described herein.

The one or more transceivers 220 transmit and receive communications signals support mechanisms for the carrier-sense multiple access and carrier aggregation of thread devices. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, drivers and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

According to some aspects of this disclosure, the processor 210, alone or in combination with computer instructions stored within the memory 250, and/or the one or more the transceiver 220, implements the methods and mechanisms discussed in this disclosure. For example, the processor 210, alone or in combination with computer instructions stored within the memory 250, and/or the one or more transceiver 220, implements mechanisms for retransmission of MLE advertisement messages. According to some aspects of this disclosure, the processor 210, alone or in combination with computer instructions stored within the memory 250, determines whether a multicast message is an MLE advertisement message. The processor 210, alone or in combination with computer instructions stored within the memory 250, retransmits, or causes retransmissions, of a same MLE advertisement transmission at periodic intervals within a transmission window and prevents retransmission of other multicast messages. For example, when a multicast signal is being transmitted, a determination is made as to whether the message is an MLE advertisement transmission. Multicast messages that are not MLE advertisements are transmitted a single time. A MLE advertisement message is transmitted multiple times before a next (e.g., different) MLE advertisement transmission occurs. In an embodiment, the processor includes MLE processing 256 and/or the transceiver 220 includes radio driver 225 that assists or carries out the MLE advertisement processing, as will be discussed in further detail below.

As discussed in more detail below with respect to FIGS. 2-5, processor 210 may implement different mechanisms for the MLE advertisement retransmission, as discussed with respect to the system 100 of FIG. 1.

As discussed above, it can be extremely detrimental to the network whenever an MLE advertisement message is not properly received. Therefore, the system 200 operates to retransmit the same MLE advertisement multiple times within a given window. As shown in FIG. 2, the processor 210 tracks an MLE advertisement transmission window. In an embodiment, this window is 30 seconds. Each time that the processor 210 detects the start of a new window, the processor 210 generates an MLE advertisement message to be multicast to the thread network. The communication infrastructure 240 moves the message to the transceiver 220, which encodes and transmits the message to the environment.

In an embodiment, in order to ensure safe reception of MLE advertisements, the processor 210 then repeats the above process multiple times before the start of the next transmission window. For example, once the first MLE advertisement has been transmitted, the transceiver 220 sends a notification message to the processor 210 via the communication infrastructure to notify the processor 210 of the completed transmission. In an embodiment, upon receipt of this notification, the processor 210 prepares the same MLE advertisement message for retransmission and sends it to the transceiver 220. The MLE message is the same as the first MLE advertisement, with the same frame counter value.

The transceiver 220 performs a repeat check on messages to ensure that only MLE messages are repeatedly transmitted to the network (repeatedly transmitting all multicast messages adds significant traffic to the network and may reduce data processing). Most messages will differ at least by their respective frame counters, if not in other additional aspects. When such messages are detected at the transceiver, those messages pass the repeat check and the transceiver 220 transmits the message to the network.

Alternatively, when an outgoing message does not pass the repeat check (i.e., it is the same as an earlier message), the transceiver next carries out an MLE check on the outgoing message. This second verification step determines whether the outgoing message is an MLE advertisement. If the message fails this check (i.e., it is not an MLE advertisement message), then the message is discarded and not transmitted. The transceiver 220 then sends a notification message to the processor 210 notifying it of the failed transmission. Alternatively, if the message passes the MLE check (i.e., the message is an MLE advertisement message), then the transceiver 220 transmits the message to the network and sends a notification to the processor 210 that transmission of the message was successful.

Upon receipt of the notification, the processor determines whether the MLE advertisement has been sent a maximum number of times and whether a current MLE transmission window has expired. Provided that the maximum number of times has not been reached and there is still time within the MLE transmission window, the processor 210 generates the same MLE transmission to be sent again and forwards it to the transceiver 220 for transmission. In an embodiment, the processor 210 also waits a predetermined amount of time before forwarding the repeat MLE advertisement to the transceiver 220.

Figure 3:
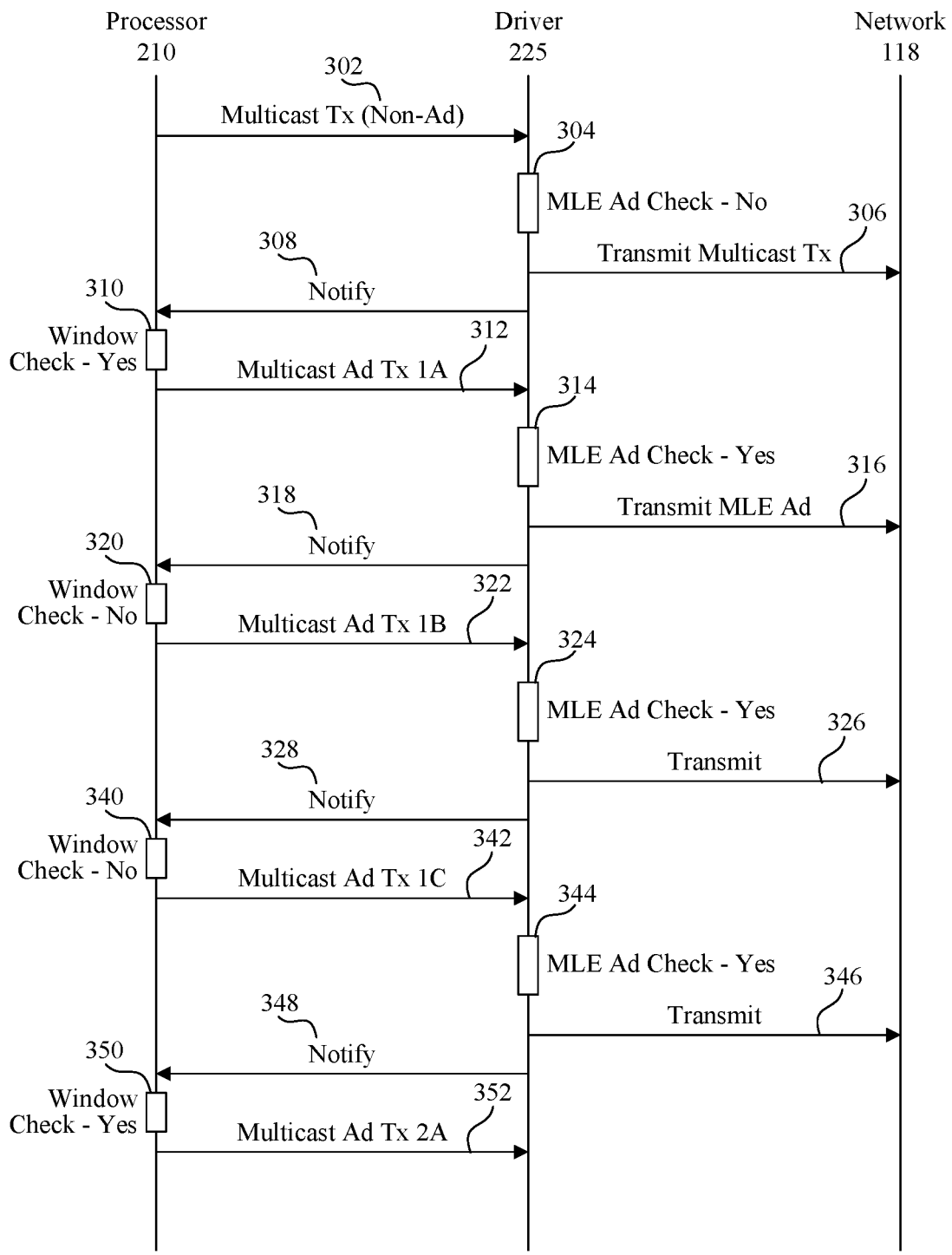
FIG. 3 illustrates a message flow diagram, according aspects of the disclosure.

In embodiments, the repeat check and MLE check are performed within a radio driver 225 of the transceiver 220, or within MLE processing 256 of the processor 210. FIG. 3 illustrates the latter implementation.

FIG. 3 is a message flow diagram 300 that illustrates an exemplary message flow between the processor 210, the radio driver 225 and the network 118 according to embodiments of the present disclosure.

As shown in FIG. 3, in some instances, the processor 210 sends a non-advertisement multicast message 302 to the driver 225. The driver 225 performs an MLE advertisement check on the message 304 and determines that the message is not an MLE advertisement. As a result, the driver 225 proceeds to cause the received message to the transmitted 306 to the network 118. The driver 225 then sends a notification 308 to the processor 210 that the message was successfully transmitted.

In another instance, the processor provides repeated multicast MLE advertisements to the driver 225 for transmission. For example, the processor 210 performs a window check 310 in order to determine whether an MLE transmission window has begun. In the example of FIG. 3, the processor 210 identifies the start of a new MLE advertisement transmission window and sends a multicast MLE advertisement message (e.g., message 1A) 312 to the driver 225.

The driver 225 performs the MLE advertisement check 314 and identifies the message as an MLE advertisement. The driver 225 then transmits the MLE advertisement 316 to the network 118 and sends a notification message 318 to the processor 210. Upon receipt of the notification message, the processor 210 again checks whether a new window has begun 320. At process 320, the processor 210 determines that a new window has not been received. Therefore, the processor 210 prepares and sends a repeat MLE advertisement 1B 322 that has the same content as MLE advertisement 1A. The driver 225 receives the message and performs the MLE advertisement check 324. After determining that the message is an MLE advertisement, the driver 225 transmits the message 326 to the network 118 and transmits a notification message 328 to the processor 210 that the message was successfully transmitted.

Upon receipt of the notification, the processor 210 performs another window check process 340. Again, the processor 210 determines that a new window has not yet begun. As a result, the processor 210 prepares and forwards another repetition of the multicast advertisement transmission 1C 342. The radio driver 225 receives the message and performs the MLE check process 344. Because the message is an MLE advertisement, this check will resolve in the positive. As a result, the radio driver 225 transmits the MLE advertisement message 346 to the network 118 and sends a notification message 348 to the processor 210.

Upon receipt of the notification message 348, the processor 210 performs another window check process 350. In the example of FIG. 3, the processor determines that a new transmission window has begun. As a result, the processor 210 prepares and sends a new multicast MLE advertisement message 2A 352 to the radio driver 225. The message flow then substantially repeats for the new MLE advertisement.

Although not explicitly shown in FIG. 3, the process flow of FIG. 3 can further include a delay timer process at either the processor 210 or the radio driver 225 to input a timing delay between each successive transmission of a repeated MLE advertisement. Additionally, the driver can further include a repetition check process that first identifies whether a message for transmission has previously been transmitted. The MLE advertisement check process would then only be invoked when the repetition check process identifies a repeat transmission.

Figure 4:
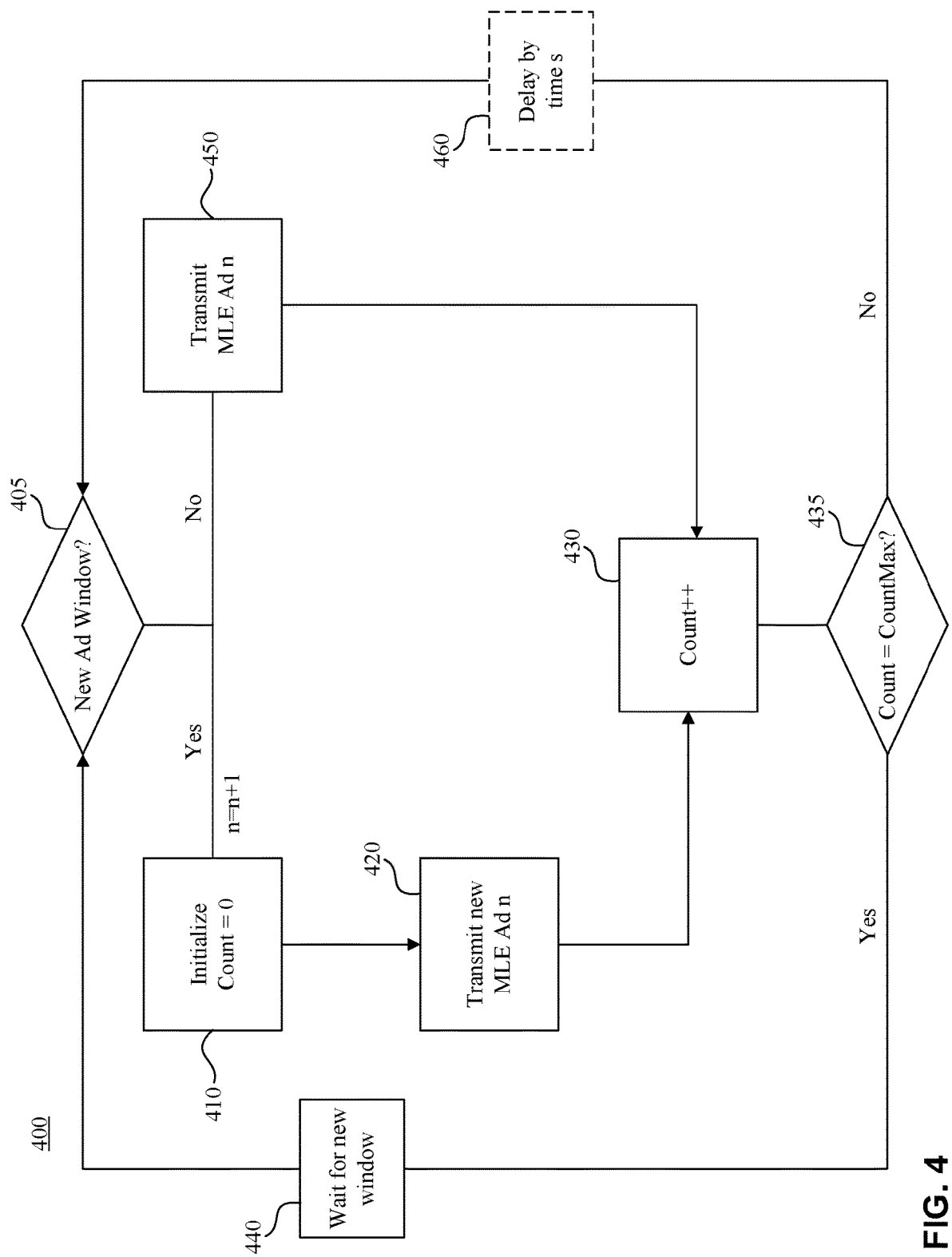
FIG. 4 illustrates a flowchart diagram of an exemplary method for carrying out MLE advertisement repetition, according aspects of the disclosure.

FIG. 4 illustrates a flowchart diagram of an exemplary method 400 for carrying out MLE advertisement repetition. As shown in FIG. 4, the method begins with step 405, in which it is determined whether a new MLE advertisement window has begun. If a new window has begun (405-Y), then a count is initialized to 0 (410). Then, a new MLE advertisement message n is transmitted to the network (420). Thereafter, the count is incremented (430).

After the count has been incremented (430), a determination is made as to whether the count has reached a predefined countMax variable (435). If the count has reached countMax (435-Y), then the system waits for a new advertisement window to begin (440). On the other hand, if count has not reached the predefined countMax variable (435-N), then the method returns to step 405.

For example, if a new advertisement window has begun (405-Y), then n is increased in order to cause a new MLE message to be transmitted at step 420. Alternatively, if a new advertisement window has not begun (405-N), then the nth MLE advertisement is transmitted again (450). This MLE advertisement has the same content as the new MLE advertisement transmitted in step 420. Thereafter the count is increased (430), and a determination is made as to whether the count has reached countMax (435). The method than loops, sending new MLE advertisements with each new advertisement window and repeating the transmission of that MLE advertisement until a new advertisement window has begun or until it has been retransmitted a maximum number of times. In embodiments, countMax is set to 3.

Optionally, after a determination that the count has not yet reached the maximum (435-N), the process is delayed by time s (460). In this embodiment, repeat messages are not sent immediately when available, but after a predetermined amount of time. In various embodiments, delay time s is set to between 1 and 10 second. Specifically, according to the thread standard, new MLE advertisements are typically sent every 30 seconds. By setting the time delay to a maximum of 10 seconds, each MLE advertisement will be sent at least 3 times within the 30 second time period (e.g., t=0, 10, and 20 s).

Returning to FIG. 2, the system 200 can also illustrate how reception of multiple MLE advertisements are processed. Specifically, the embodiments of the present disclosure are intended to improve reception of MLE advertisements by network devices. However, if a recipient device has already received a current MLE advertisement, then it becomes superfluous and inefficient to process additional copies of the same message. As a result, the system 200 is configured to check each received MLE advertisement to determine whether it is a duplicate. This check can be performed based on a frame counter included within the MLE advertisement that uniquely identifies each different MLE advertisement, but is the same for each repeated MLE advertisement.

In an embodiment, transceiver 220 receives an MLE advertisement message via antenna 260. The transceiver 220 provides the received message to the processor 210 via the communication infrastructure 240. The processor 210 first identifies the message as an MLE advertisement. Then, the processor extracts an identifier from the MLE advertisement message. In an embodiment, the identifier is a frame counter. The processor then accesses the memory 250, where a previously-extracted frame counter was stored. The processor 210 performs a comparison to determine if the extracted frame counter matches that of the previously-stored frame counter. If the processor 210 identifies a match, then the processor 210 discards the received MLE advertisement message. On the other hand, if the processor 210 does not detect a match, the processor 210 stores the extracted frame counter in the memory 250 and proceeds to process the received MLE advertisement message. In an embodiment, each distinct frame counter is stored for a predetermined period of time. In an embodiment, the predetermined period of time is 30 seconds.

Figure 5A:
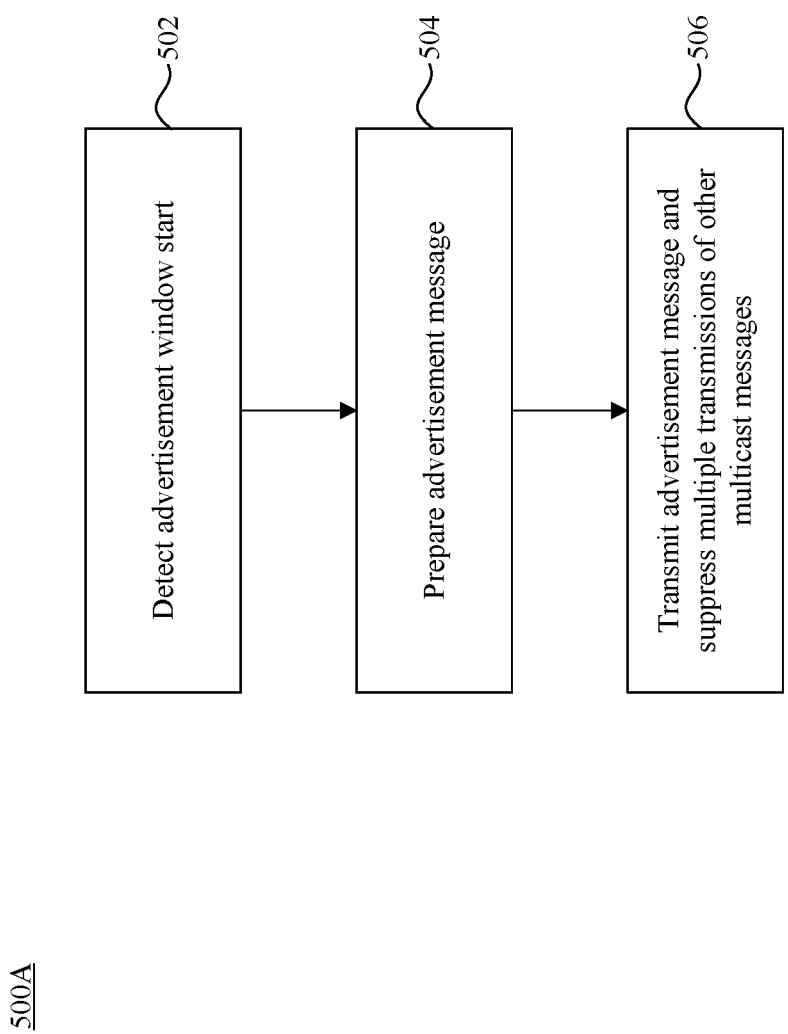
FIG. 5A illustrates a flowchart diagram of an exemplary method for transmitting MLE advertisements, according to aspects of the disclosure.

FIG. 5A illustrates a flowchart diagram of an exemplary method 500A for transmitting MLE advertisements according to embodiments of the present disclosure. As shown in FIG. 5A, the method begins with a transmitting device detecting the start of an advertisement window (502). According to aspects of the disclosure, the advertisement window has a predefined duration. After the window is detected, the device then prepares an advertisement message (504). The device causes a transceiver to transmit the advertisement message to the network (506). According to aspects of the disclosure, the device causes the transceiver to transmit the advertisement message a plurality of times within the duration of the advertisement window, and suppresses multiple transmissions of other messages, including multicast messages. According to aspects of the disclosure, the advertisement message is transmitted three times during the advertisement window.

Figure 5B:
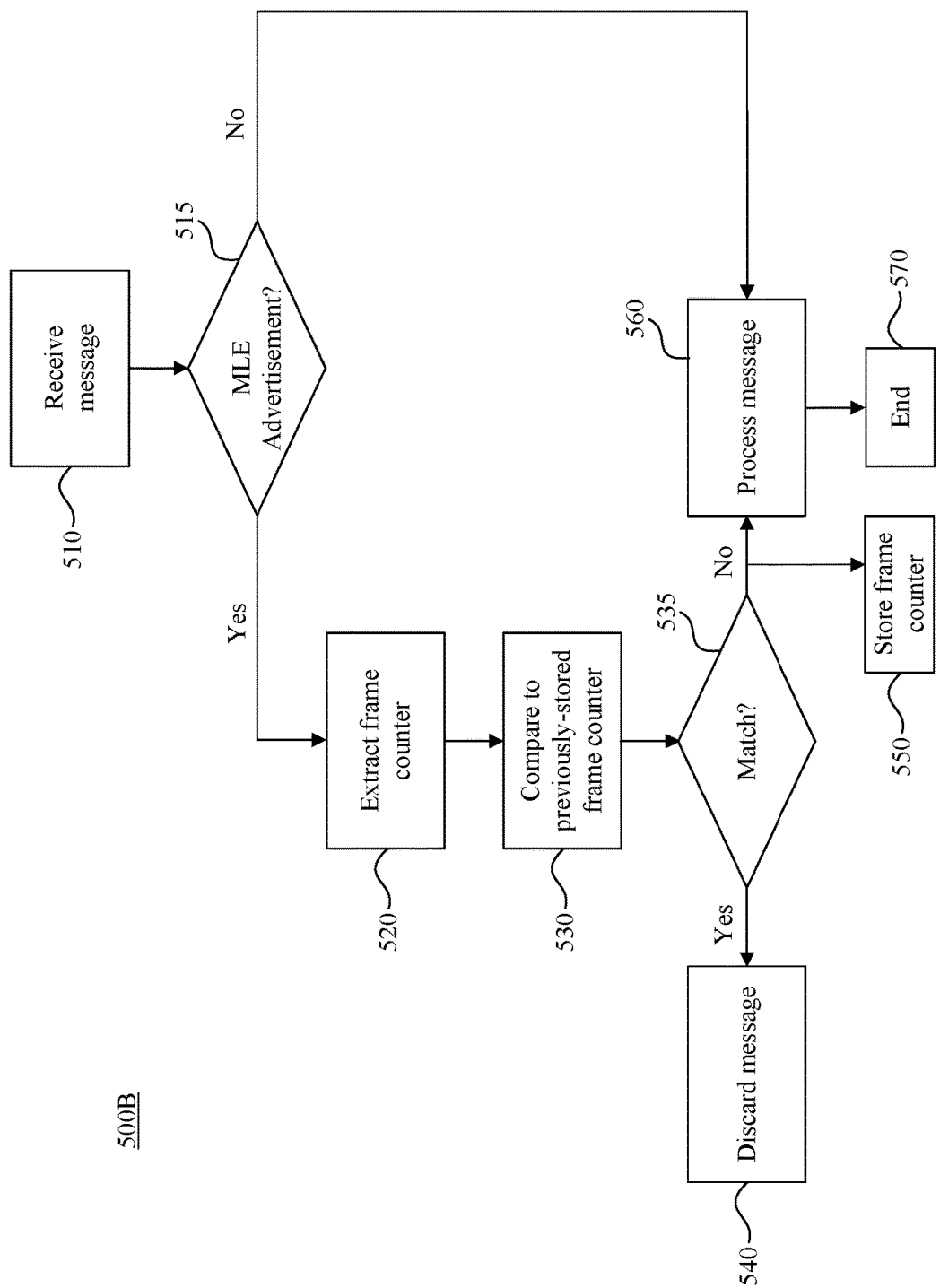
FIG. 5B illustrates a flowchart diagram of an exemplary method for receiving MLE advertisements, according aspects of the disclosure.

FIG. 5B illustrates a flowchart diagram of an exemplary method 500B for receiving MLE advertisements according to embodiments of the present disclosure. As shown in FIG. 5B, a recipient device first receives a new message from the network (510). Then a determination is made as to whether the received message is an MLE advertisement (515). If the message is not an MLE advertisement (515-N), then the message is processed as normal (560). The method then ends (570).

Alternatively, if the message is an MLE advertisement message (515-Y), then an identifier is extracted from the message (520). In an embodiment, the identifier is a frame counter. The extracted frame counter is then compared to a previously-stored frame counter (530). A determination (535) is then made as to whether the extracted frame counter matches a previously-stored frame counter. If there is a match (535-Y), then it is determined that the received MLE advertisement is the same as one that was previously processed and the message is discarded (540). Alternatively, if there is no match (535-N), then the extracted frame counter is stored in memory (550) and the message is processed (560). Then the method ends (570).

Figure 6:
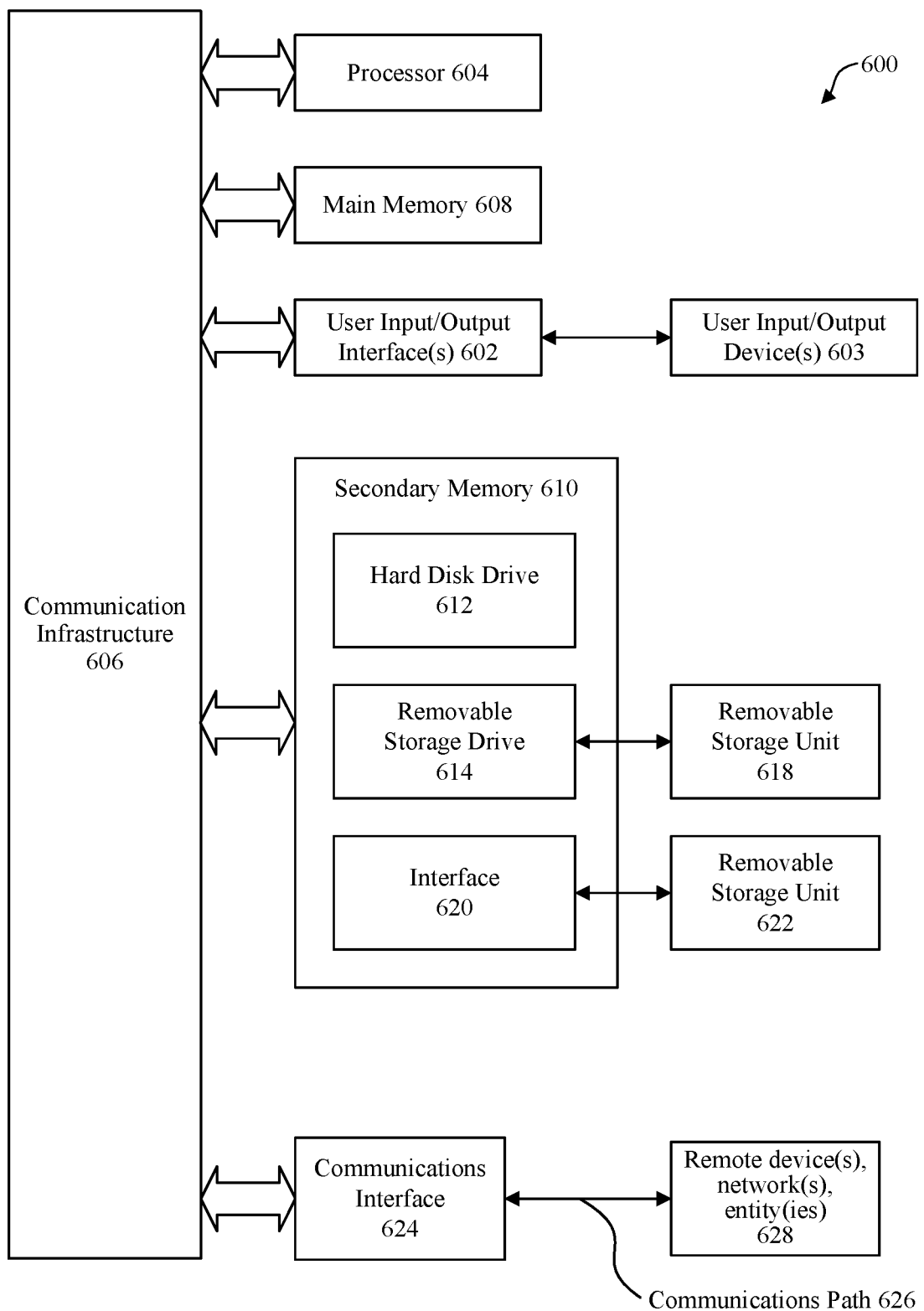
FIG. 6 illustrates an example computer system for implementing some aspects of the disclosure or portion(s) thereof.

Various aspects may be implemented, for example, using one or more computer systems, such as computer system 600 shown in FIG. 6. Computer system 600 may be any well-known computer capable of performing the functions described herein such as the one or more end devices 102, the one or more thread leader devices 104, the one or more thread router 106, and the one or more border router 108 of FIG. 1, or 200 of FIG. 2. Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A wireless communication device, comprising:
   a transceiver configured to communicate with a second wireless communication device; and
   a processor communicatively coupled to the transceiver and configured to:
   detect a start of an advertisement window having a predefined duration;
   prepare an advertisement message in response to the detecting, wherein the advertisement message is a multicast message;
   transmit, via the transceiver, the advertisement message to a network a plurality of times during the predefined duration of the advertisement window; and
   suppress transmission of one or more other multicast messages during the predefined duration of the advertisement window.

2. The wireless communication device of claim 1, wherein the advertisement message is a mesh link establishment advertisement message.

3. The wireless communication device of claim 1, further comprising a radio driver configured to verify that an outgoing message is the advertisement message and to notify the processor of successful transmission of the advertisement message.

4. The wireless communication device of claim 1, wherein the transceiver includes a radio driver configured to process messages for transmission.

5. The wireless communication device of claim 4, wherein the radio driver is configured to filter non-Mesh-Link Establishment (MLE) advertisement messages from being retransmitted.

6. The wireless communication device of claim 1, wherein the processor is further configured to prepare the advertisement message with an identifier.

7. The wireless communication device of claim 6, wherein each of a plurality of advertisement message transmissions include the identifier.

8. The wireless communication device of claim 4, wherein the radio driver is further configured to delay each successive transmission of the advertisement message by a predefined delay.

9. A method for repeated transmission of an advertisement message in a thread network, comprising:
   detecting a start of an advertisement window having a predetermined duration;
   preparing the advertisement message in response to the detecting, the advertisement message being a multicast message;
   transmitting the advertisement message to the thread network a plurality of times within the advertisement window; and
   suppressing transmission of one or more other multicast messages during the predefined duration of the advertisement window.

10. The method of claim 9, wherein the advertisement message includes an identifier.

11. The method of claim 10, wherein the identifier is a frame counter.

12. The method of claim 9, wherein the advertisement message is a mesh link establishment advertisement message.

13. The method of claim 9, further comprising:
    verifying, by a radio driver, that an outgoing message is the advertisement message; and
    notifying a processor of successful transmission of the advertisement message.

14. The method of claim 9, further comprising filtering non-advertisement messages from being transmitted to the thread network multiple times.

15. A wireless communication device, comprising:
a transceiver configured to communicate with other devices within a wireless network; and
a processor communicatively coupled to the transceiver and configured to:
receive a message from the wireless network;
identify the message as an advertisement message;
extract, based on the identifying, an identifier from the message;
compare the extracted identifier to a previously stored identifier;
process or discard the message based on the comparing; and
store the extracted identifier for a predetermined period of time after the extracting, the storing enabling a comparison with an identifier of a future received message.

16. The wireless communication device of claim 15, wherein, responsive to a determination that the extracted identifier does not match the previously stored identifier, the processor is further configured to overwrite the previously stored identifier with the extracted identifier.

17. The wireless communication device of claim 16, wherein the extracted identifier is a frame counter.

18. The wireless communication device of claim 15, wherein the processor is further configured to discard the message in response to determining that the extracted identifier matches the previously stored identifier.

19. The wireless communication device of claim 15, wherein the processor is further configured to process the received message in response to determining that the extracted identifier does not match the previously stored identifier.

20. The wireless communication device of claim 15, wherein the received message is a multicast mesh link establishment advertisement message.

* * * * *